Patented Apr. 3, 1923.

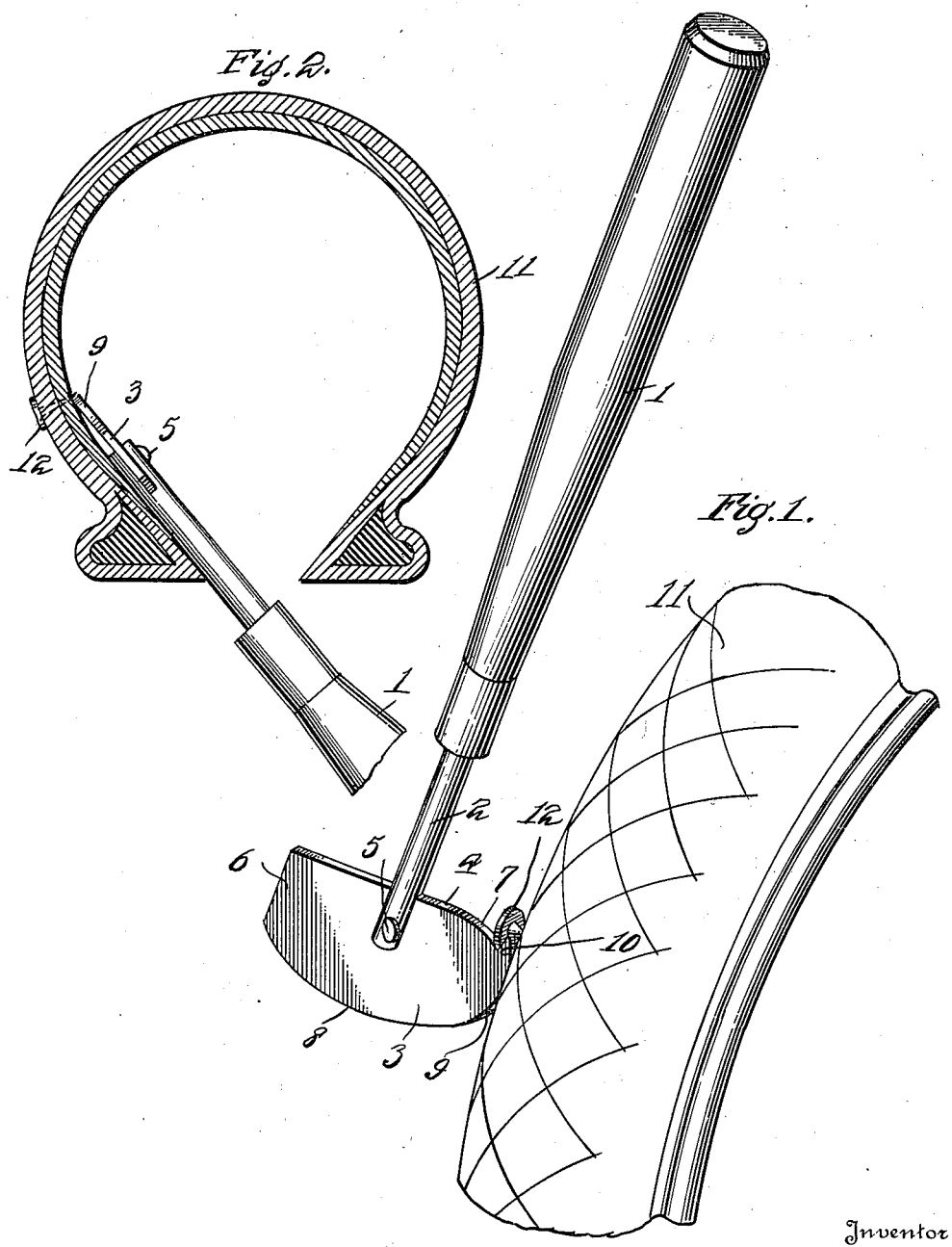

1,450,209

UNITED STATES PATENT OFFICE.

FRED HAYS, OF TUCKAHOE, NEW JERSEY.

TIRE TOOL.

Application filed August 7, 1922. Serial No. 580,145.

*To all whom it may concern:*

Be it known that I, FRED HAYS, a citizen of the United States, residing at Tuckahoe, in the county of Cape May and State of New Jersey, have invented certain new and useful Improvements in a Tire Tool, of which the following is a specification.

This invention relates to new and useful improvements in a tire tool and has for its principal object to provide a device whereby any tacks or other foreign substance which protrude through the tire tread may be easily located by use of such a tool and withdrawn from the tire casing.

Another object of the invention is to provide a tire tool of the above mentioned character, which is adapted to be used on the inner side of the tire casing whereby the same will engage the tire casing on the inner side and locate any tacks extending therethrough.

A still further object of the invention is to provide a tire tool of the above mentioned character, which is simple in its construction, inexpensive, strong and durable.

Other objects and advantages of this invention will become apparent during the course of the following description.

In the drawings forming a part of this specification and in which like numerals designate like parts throughout the same, Figure 1 is perspective view showing the tool being used in removing a tack from the tire casing, and Figure 2 is a side elevation showing the tool in use upon the inner side of a tire casing shown in section.

In the drawings wherein for the purpose of illustration is shown the preferred embodiment of my invention, the numeral 1 designates the handle of the tire tool and carried by the handle 1 at its forward end is a shank 2. This shank 2 is bifurcated at its outer end for the purpose of receiving the relatively broad plate 3. This relatively broad plate 3 has its bottom edge 4 resting within the bifurcated portion of the shank 2 and is secured therein intermediate its ends by means of a suitable fastening element 5.

The relatively broad plate 3 has one end thereof extending at right angles to the bottom edge 4 as shown more clearly at 6 in Figure 2 of the drawing. The bottom edge of the plate 3 has its opposite end cut away to form a notch 7 for a purpose hereinafter to be fully described. The outer edge 8 of the plate 3 is curved from the end 6 of the blade and this curved edge 8 extends rearwardly on the opposite end of the plate 3 to form a rounded portion 9. This rounded portion 9 of the plate 3 extends rearwardly of the cut away portion of the bottom edge of the plate 3 in such a manner as to provide a tack head engaging portion 10 which is adjacent the notch 7.

The plate 3 is a relatively broad piece of metal and is also relatively thin. Its edges are blunt so as to prevent the cutting of any portion of the tire while in use and it will be noted from Figure 2 of the drawing that if a tack should protrude through the tire casing 11 the tool would then be inserted within the inside of the tire casing and adapted to be moved or worked around the inner surface of the tire casing until the tack which is lodged in the tire casing is engaged by the curved outer edge 8 of the plate 3.

After the tack has been located by means of the curved outer edge 8, the tool is then removed from within the tire casing and the tool is then placed upon the outer face of the tire casing as shown in Figure 1 of the drawings in such a manner that the tack engaging portion 10 engages the head of the tack 12 and the rounded portion 9 on the plate 3 will act as a fulcrum and the tack can be easily removed. The head of the tack resting within the notch portion 7 whereas the tack engaging portion 10 will engage the under side of the head of the tack and thereby assure a positive pull upon the tack.

It will thus be seen from the foregoing description that an easy method for the removal of tacks from a tire casing both in locating the tack and removing the same has been accomplished. As has been the custom, when a tack becomes embedded into a tire casing, considerable time is spent in locating the same by moving the palm of the hand within the tire casing until the tack is located. Furthermore it is necessary to employ an additional tool to remove the tack after the same has been located. With my tool it will thus be seen that the tack can be easily located and quickly removed without the necessity of employing a number of tools.

It is to be understood that the form of my invention herewith shown and described is to be taken as the preferred embodiment of the same and that various changes in the same, and in the size and arrangement of parts may be resorted to without departing from the spirit of the invention and the scope of the subjoined claims.

Having thus described my invention what I claim as new and desire to secure by Letters Patent is:—

1. A tool for locating and removing foreign substance from tire casings comprising a relatively broad flat plate, a handle secured to and projecting laterally from the inner edge of the plate, the outer edge of the plate being curved, and means for engaging the substance to be removed from the casing disposed at one side of the curved outer edge of the plate.

2. A tool for locating and removing foreign substances from tire casings comprising a relatively broad flat plate having a straight inner edge and a curved outer edge, a handle secured to the plate and projecting laterally from the inner straight edge thereof, and a hook formed on one side edge of the plate adjacent to the inner edge of the plate at one side of the curved edge for engaging the substance to be removed from the tire casing.

In testimony whereof I affix my signature in presence of two witnesses.

FRED HAYS.

Witnesses:
JNO. S. SMITH,
MINNIE G. HAYS.